United States Patent [19]
Hirsch

[11] Patent Number: 4,990,734
[45] Date of Patent: Feb. 5, 1991

[54] APPARATUS FOR PREPARING FILTERED COFFEE BY USE OF MICROWAVE ENERGY

[76] Inventor: Paul Hirsch, Karl-Theodor-Strasse 91, D-8000 München, Fed. Rep. of Germany

[21] Appl. No.: 283,585

[22] Filed: Dec. 13, 1988

[30] Foreign Application Priority Data

Dec. 15, 1987 [DE] Fed. Rep. of Germany ....... 3742507

[51] Int. Cl.⁵ .............................................. H05B 6/80
[52] U.S. Cl. ........................ 219/10.55 E; 219/10.55 F; 99/306; 99/DIG. 14
[58] Field of Search ................. 219/10.55 E, 10.55 R, 219/10.55 F; 99/304, 306, 283, 295, DIG. 14, 451

[56] References Cited

U.S. PATENT DOCUMENTS

| | | |
|---|---|---|
| 2,601,067 | 6/1952 | Spencer . |
| 3,060,836 | 10/1962 | Varney . |
| 4,104,957 | 8/1978 | Freedman et al. ............ 219/10.55 E |
| 4,381,696 | 5/1983 | Koral ..................................... 99/304 |
| 4,386,109 | 5/1983 | Bowen et al. ................. 219/10.55 E |
| 4,520,716 | 6/1985 | Hayes ..................................... 99/306 |
| 4,577,080 | 3/1986 | Grossman .................... 219/10.55 E |
| 4,642,443 | 2/1987 | Jorgensen et al. ........... 219/10.55 E |

FOREIGN PATENT DOCUMENTS 0177281 4/1986 European Pat. Off. .
0288899 4/1988 European Pat. Off. .
1336781 7/1963 France .

Primary Examiner—Philip H. Leung
Attorney, Agent, or Firm—Ostrolenk, Faber, Gerb & Soffen

[57] ABSTRACT

An apparatus for preparing filtered coffee by use of microwave energy includes a vessel for containing the filtered coffee and a container having a single compartment for receiving and retaining a non-heated coffee mixture of coffee grounds and water. The vessel has a vessel opening formed therein and the container includes an outlet adapted to be received by the vessel opening to pass the coffee mixture therethrough to the vessel. Heating means heats the coffee mixture through exposure to microwave energy. A filter means is disposed across the outlet and includes a resistance to flow which is slight enough that the heated mixture passes through a filter to emerge as a filtered coffee.

13 Claims, 2 Drawing Sheets

APPARATUS FOR PREPARING FILTERED COFFEE BY USE OF MICROWAVE ENERGY

BACKGROUND OF THE INVENTION

The present invention relates to a method and to an apparatus for preparing filtered coffee, another heat brewable liquid, or the like using microwave radiation during the heating and filtering.

A traditional coffee maker uses a coffee pot on which a separate container is placed. The container is substantially open at its top while being closed on its bottom by a filter e.g. of filter paper. Powdered coffee to be leached by heated water and then filtered is dumped onto the filter paper. In a heating device, which is similar to a flow heater, cold water is heated. At a low rate of flow, the heated water drips onto the ground coffee, seeps through the ground coffee to be mixed with and become drinkable coffee and finally drips through the filter into the coffee pot.

This method is very time consuming and inefficient, since the water which drips down onto the coffee in this process is again cooled, so that the powdered coffee cannot be sufficiently leached out.

It is also known from espresso machines to force hot water or steam at high pressure through a layer of powdered coffee which is contained between two screen surfaces. But this known apparatus is too expensive for household use and also too dangerous for such use because of the high internal pressure used in the machine. Furthermore, it is possible to use this apparatus to prepare filtered coffee rapidly only if hot water or steam is already available.

A coffee maker has also been proposed (Federal Republic of Germany No. OS 2,829,567), in which microwave radiation is used for the heating of water. The water can be heated faster this way than with some other sources of electric heating using the same power. For this purpose, a microwave pervious container for cold water is provided above the filter, which container is intended to receive the ground coffee, and the container is connected to the filter by a thermostatic valve. During use, the entire apparatus is placed in a microwave oven, which is operated to rapidly cause the water to boil. The boiling temperature causes the thermostatic valve to open, and the boiling water passes to the coffee filled filter, through which it drips.

With this unit, the time required for the preparation of filtered coffee is only insignificantly shortened, as compared with the aforementioned known method. Furthermore, care must be taken that the ground filter coffee is carefully screened off from the microwave radiation rays, since tests have shown that ground coffee burns after only a very short period of microwave radiation and long before the water for pouring onto the coffee boils.

In a known apparatus in which coffee is filtered through a filter paper, it has been found that mocha, which is finely ground coffee to which cold water and sugar are added and boiled together, can be filtered only very slowly.

Another apparatus has been proposed (Federal Republic of Germany No. OS 3,206,803) which is substantially similar to a traditional espresso machine. It includes, seated one on the other, a coffee pot, a filter to receive coffee which is closed off by two screening surfaces, and a water container. The water container is pervious to microwave radiation and the filter is developed so that substantially no liquid can pass through the filter under atmospheric or ambient pressure.

The known apparatus is placed in a microwave oven in which the microwave radiation brings the water in the water container to a boil, while the coffee remains screened off. The formation of steam develops such a high pressure in the water container (up to 3.45 bar) that the water is forced through the filter with this pressure.

The use of paper filters is not possible in such an apparatus since, depending on the type of filter paper used, an uncontrolled increase in pressure can take place within the water container.

SUMMARY OF THE INVENTION

Proceeding from this state of the art, the object of the present invention is to improve the method and apparatus disclosed in the last mentioned publication such that it is possible to prepare filtered coffee, filtered mocha, and the like brewable liquids, as rapidly and in as high a yield as possible without having to tolerate dangerously high pressure within the apparatus. Furthermore, the use of filter paper is to be made possible.

The invention concerns both a method of preparing filtered coffee, or the like brewable items, such as ersatz coffee and tea, that start as dry ground material. Hereafter filtered coffee is described. A mixture of ground coffee, or the like, mixed with unheated water is placed in a container having an opening. A filter is placed across the container opening which is capable of holding back the particles of the mixture while permitting the filtrate and water to pass through. That container, in turn, is seated in an opening in a vessel, such as a coffee pot in which the filtered coffee is to be collected.

Most broadly expressed, the concept of the invention comprises heating the mixture which is held at one side of the filter with microwave radiation for producing a pressure gradient across the filter to positively force the filtrate, which is formed after the heated water has leached the coffee from the ground particles, through the filter where the filtrate is collected in the vessel. The filter has openings or pores that are selected so that the water and the filtrate drip through the filter as a result of the static pressure present with the mixed material and water at one side of the filter.

It is desirable to counteract the effect of the static pressure which causes undesired preliminary dripping of the filtrate before the water has been heated. To accomplish this, the mixture is initially subjected to a vacuum upstream of the filter to counteract the effect of the static pressure or, alternatively, a positive pressure is established downstream of the filter for the same purpose. One way of developing the positive pressure in the vessel is to supply a small amount of water there and to heat that water to a boil, which produces steam in the vessel at an elevated pressure. That has an additional benefit that upon cooling of the steam in the vessel, it generates a vacuum in the vessel which helps draw the filtrate through the filter.

For best operation, the water both in the vessel and in the mixture are brought to a boil by microwave radiation. Where appropriate, one or the other of the mixture being filtered and the filtrate are screened off, at least in part, from the microwave radiation to prevent undesired burning and boil off.

The container is at least substantially closed and is removably placed in the vessel opening. The filter extends across that opening. The characteristics of the filter are mentioned above. The filter may include a filter screening surface and may have a filter paper piece applied atop it. The filter is supported to the opening in the container in a manner which enables it to be popped off the container if excessive pressure develops in the container.

The container and/or the vessel are at least partially pervious to microwave radiation.

In one embodiment, the vessel has a neck with a vessel opening into the neck. The container has a bottom with a container opening into it. A flexible sealing cuff is disposed between the vessel and the container and fits around the neck of the vessel and is arranged on the bottom of the container. This permits steam to exit from the vessel as needed in order to produce the vacuum in the vessel as needed for drawing filtrate through the filter.

The method of the invention differs from the basic method known from Federal Republic of Germany No. OS 3,206,803 by three steps:

The ground coffee is not introduced into a closed filter where it is screened off from access by microwave radiation. Instead, it is mixed, possibly together with sugar, chicory, cinnamon or other additional substances, with that amount of cold water which is basically necessary for the preparation of the coffee.

This mixture is then subjected to the microwave radiation, whereby the individual particles of coffee are also heated by the microwave radiation as a result of their content of oil and fat. The aromatic substances contained in the particles of coffee are released and can be given off to the surrounding water. This is the reason for the particularly high yield of the method of the invention.

The resistance to flow of the filter is set at a value similar to that value present in the aforementioned traditional electric coffee makers in which the coffee is filtered on basis of its static pressure. At the same time, only slight pressure gradient is permitted over the filter so as to not produce any danger of explosion. Such explosion could occur in known apparatus of this type if that apparatus is subjected to excessively high power in a microwave oven.

The slight pressure gradient serves merely to accelerate the filtering process.

However, the filtering process in the invention also starts earlier, so that when the mixture starts to bubble as it is being heated, it is already at that time being filtered. A buildup of pressure, as occurs in the known apparatus of this type, is not necessary. At the same time, during the bubbling of the mixture, the ground coffee is eddied by convection flows within the mixture, so that the ground coffee does not deposit on the screen surface or the filter paper and clog its pores. For this reason, mocha, which is completely and rapidly filtered, can be readily prepared by the method of the invention while it was previously not possible.

In the method of the invention, the filtrate is first produced from the cold mixture before it is heated, even though only a small quantity is then produced. In order to reduce the cold mixture filtrate to a minimum, in accordance with the preferred embodiments of the invention, in order to counteract the static pressure of the mixture, a slight vacuum is produced upstream of the filter or a slight positive pressure is produced downstream of the filter, so that even when the apparatus of the invention is already filled and a lengthy time elapses until the action of the microwave radiation, the entire mixture is not immediately filtered cold.

In order to counteract this static vacuum, the container for receiving the mixture can be developed similarly to the water container of the prior art publication, and therefore can be developed as a container whose sole opening is closed by the filter. If this container is filled with the mixture and then is turned so that the filter faces downward for the placing of the container on the coffee pot, then only a slight amount of filtrate emerges, since a vacuum which counteracts the static pressure is very soon formed within the container.

It is also possible to introduce the mixture into a similarly developed container which, however, is open on the top and to then arrange this container in sealed manner in the sole opening of a coffee pot. In this case, a slight positive pressure very rapidly forms within the coffee pot and prevents the further dripping of the mixture through the filter.

In the last mentioned case, the coffee pot itself is formed of material which is at least partially pervious to microwave radiation. Before the filter is placed on the container opening, a small amount of water is introduced into the coffee, this amount being less than the amount of water used for the mixture. The water first boils in the coffee pot and vaporizes to a substantial extent. At the same time, the mixture is heated to the desired amount, and then the microwave action is interrupted. In this connection, the steam contained in the coffee pot cools rapidly, producing a vacuum which draws the coffee through the filter into the coffee pot.

After the filtering and the production of the pressure equalization, the container can easily be removed from the coffee pot. If a container is used within which a positive pressure is established, then the filter is preferably developed as a container safety closure, which is loosened when the internal pressure within the container exceeds a given value.

If, for instance, such an apparatus, which had been designed for use in a microwave oven of small power, is instead used in a microwave oven of high power, so that the pressure increases excessively within the closed container, pressure equalization takes place by the filter insert being forced downward onto the coffee pot without any part of the microwave oven being dirtied.

In order to adapt the apparatus of the invention to the power of the microwave radiation impinging on this apparatus, it is also possible to provide the closed container with a small diaphragm, which reduces the pressure, and/or to screen the container and/or coffee pot off, at least in part, from microwave radiation, for instance, by the application of a metallic coating.

The apparatus of the invention, in which a vacuum is produced by steam in the vessel for the filtrate or in the coffee pot, can also be used in a manner other than that which has been described. It is possible, for instance, to introduce clean water into the container for the filtrate and to place this apparatus in a microwave oven until this water boils. In this case, as mentioned above, a small amount of water must be introduced into the filtrate vessel or the coffee pot. This amount of water is so adapted to the amount in the mixture container that the water in the filtrate container is already vaporized to a sufficient extent before the water in the mixture container starts to boil. At this time, the steam must not yet have cooled, or at least have cooled only slightly.

The apparatus is now removed from the microwave oven and the coffee, coffee mixture, or the like, is added to the practically boiling water in the mixture container. When the steam has cooled sufficiently, which depends upon the volume and the heat insulation of the filtrate vessel as well as the surrounding temperature, the pressure in this vessel drops rapidly which draws the brew, which has meanwhile been formed in the mixture container, through the filter.

A satisfactory filter may be a screening surface which is covered by traditional disposable filter paper. However, a permanent filter is particularly advantageous, and preferably a filter of so called glass foam (particles of glass which have been coalesced in the furnace) which can have the same dimensions as the filter paper and can be used optionally instead of the filter paper.

The suction vessel must be of sufficient volume to still have a sufficient vacuum for the complete drawing also of the last trace of filtrate through the filter. In this connection, based on tests with filter coffee, a particularly satisfactory size for such a vessel is a size suitable for the preparation of one portion (two cups) of coffee.

Other objects and features of the present invention will become apparent from the following description of the preferred embodiments of the invention considered in conjunction with the accompanying drawings.

DESCRIPTION OF THE PREFERRED EMBODIMENTS

Figure 1:
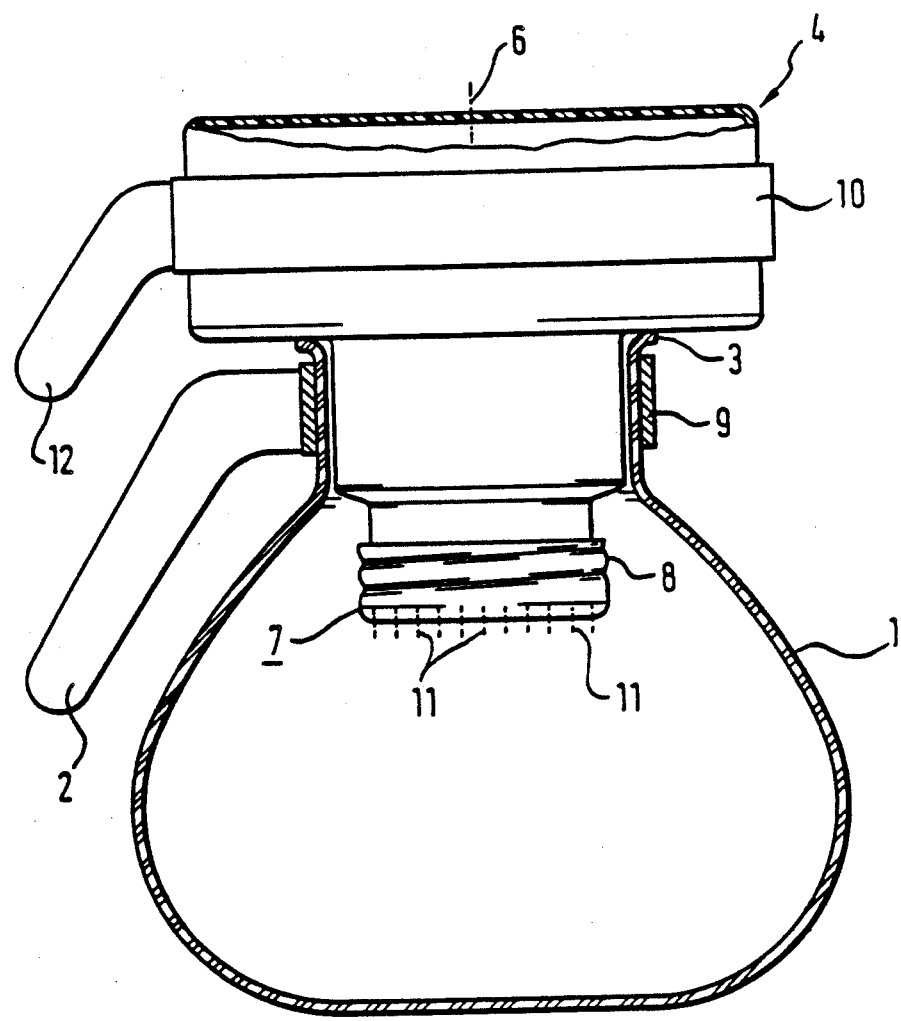
FIGS. 1 and 2 show two preferred embodiments of the invention.

In the two embodiments, the same parts have been provided with the same reference numerals and will be described below only once.

Figure 2:
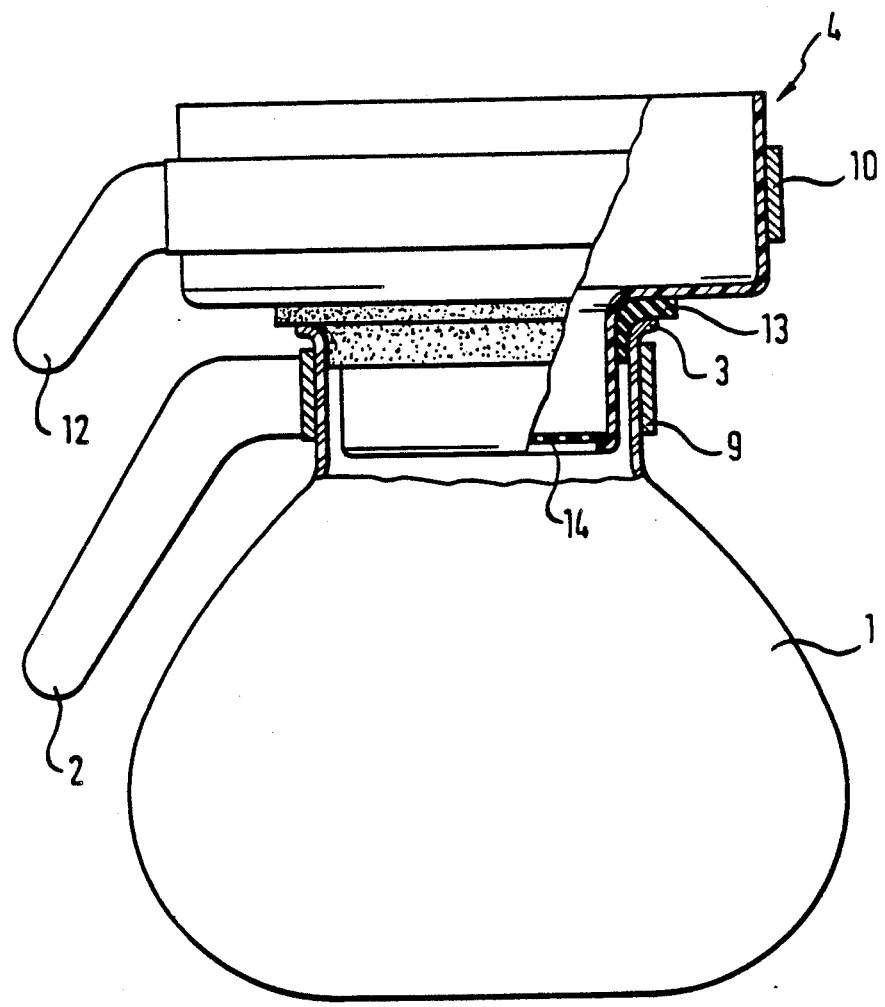

The apparatus shown in FIGS. 1 and 2 is formed of a coffee pot 1, which is preferably made of glass, but which may also be made of a similar temperature resistant material which is pervious to microwave radiation, for instance, ceramic material or plastic.

In the embodiment of FIG. 1, the material of the coffee pot 1 can contain additives which result in its being heated when acted on by microwave radiation in order even better to avoid premature cooling of the filtered coffee to be received by the coffee pot 1.

The coffee pot 1 has a neck which terminates in a flat rim 3 which is curved outward in a flange-like manner. The neck is clamped by a ring 9, to which a handle 2 is fastened. This ring 9 can be formed of metal for reasons explained further below.

Within the neck of the coffee pot 1, there is seated a mixture container 4. In the embodiment of FIG. 1, the container 4 has the shape of a closed can with a downwardly protruding neck which, in turn, is closed by a perforated closure lid 7.

The body of the can-like mixture container 4 sits loosely on the rim 3 and is surrounded by a ring 10 to which a handle 12 is secured.

The perforated closure lid 7 has holes 11, diagrammatically indicated in the drawings. The holes can be covered on the inside of the lid by an inserted sheet or disc of filter paper.

The closure lid 7 is screwed onto the neck of the mixture container 4 by a safety thread 8. This thread is so dimensioned that when an excessively high pressure is produced within the mixture container 4, the thread yields, so that the perforated closure lid 7 can move downward.

The mixture container 4 is preferably formed of a heat resistant plastic which is pervious to microwave radiation, for instance, a polycarbonate.

For preparation of coffee, the mixture container 4 is lifted out of the coffee pot 1 and is turned upside down. The closure lid 7 facing upward is then unscrewed. Coffee and possibly sugar, cocoa, chicory or cinnamon, are poured into the mixture container 4 and the proper corresponding quantity of water is also introduced. A sheet of filter paper, which is dimensioned to exactly cover the holes 11 of the closure lid 7, is then introduced into the hollow of the lid. The closure lid is then screwed back onto the mixture container 4. The closure container 4, possibly gripped by the handle 12, is swung briefly in order to mix the contents, and is then placed from above, closure lid 7 again downward, on the opening of the coffee pot 1.

A small amount of cold water now drips out of the container 4 and through the closure lid 7, but only until such a vacuum has been established within the mixture container 4 such that it counteracts the static pressure which the mixture exerts on the filter paper.

This arrangement is now introduced into a microwave oven which has been programmed for a suitable predetermined time of operation. During the action of the microwave radiation, the mixture in the mixture container 4 is heated to just below the boiling point. As soon as the mixture starts to boil, it is pressed downward through the filter paper by the positive pressure that develops in the mixture container 4 due to the boiling, and the filtrate drips into the coffee pot 1. Further action by the microwave radiation should then soon be interrupted, in order to prevent the residues remaining on the filter paper, as well as the filter paper itself, from starting to burn.

In order to prevent the above problem, or at least reduce the possibility it might occur, and at the same time to prevent the filtrate from being brought to a boil, the coffee pot 1 can be formed of a material which is impervious to microwave radiation and which is also able to screen off the lower part of the mixture container, at lid 7, which receives the filter.

The attachment bands 9 and 10 for the fastening of the handles 2 and 12 can also be formed of metal and can be of such a width that a given dosed screening of the mixture contained in the container 4 is achieved. By appropriate dimensioning of these holding bands 9 and 10, it is possible to develop the same apparatus for use in microwave ovens of different power. The handles can alternatively also be glued on, and if microwave radiation screening is necessary, this can be obtained by gluing-on a metal foil or by applying a layer of metal by vapor deposition.

After removal of the apparatus from the microwave oven, the container 4 is lifted out of the pot 1 by the handle 12.

As tests have shown, only three minutes is required in order to prepare four cups of filter coffee.

After the removal of the container 4 from the pot 1, the closure lid 7 can be unscrewed. The residue remaining in the lid is completely dry and can be simply shaken out. The filter paper, which is also practically dry, can be reused several times.

As comparative tests have shown, the filtrate produced by the apparatus of the invention is stronger in flavor than a traditional filter coffee prepared with the same amounts of coffee and water.

The arrangement of the holes 11 and the closure lid 7 is not critical, since the coffee is already leached out during the heating of the mixture and not merely during the filtering.

FIG. 1 diagrammatically shows a diaphragm opening 6 through which steam can escape during the preparation of the coffee so that the internal pressure within the container 4 is lowered. In the actual embodiment, the diaphragm opening 6 is arranged so that it can easily be closed by a finger of the hand holding the handle 12 when the container 4 is filled with coffee, and the like, as well as with water.

In the embodiment of FIG. 1, a slight positive pressure is produced in the container 4. In contrast, a slight vacuum is produced in the coffee pot 1 in the embodiment of FIG. 2.

For this purpose, the coffee pot 1 is made of a material which is at least substantially pervious to microwave radiation. The mixture container 4 does not sit directly on the edge 3 of the coffee pot 1, as in the embodiment of FIG. 1. Instead, a flexible sealing cuff 13 is arranged on the neck-like extension of the mixture container 4. The cuff, for instance, may be formed of silicone rubber or of some other material which cannot be damaged by microwave radiation. The cuff 13 seals against the edge 3 and the neck of the coffee pot 1.

The installed inverted mixture container 4 in FIG. 2 is open on its top. It can be covered over its top by a lid, or the like, which, however, must be developed so that it does not produce an airtight closure.

To operate this embodiment, a small amount of water, for instance about half a cup, is introduced into the pot 1, and the mixture container 4 is placed in a sealing fashion on the pot. The bottom of the mixture container 4 is formed by a filter plate 14 on which a sheet of filter paper can be placed, as in the embodiment of FIG. 1. The desired amount of coffee, or the like, is then introduced into the mixture container 4, which is then filled with the desired amount of water. This desired amount of water is substantially more than the amount of water which is present in the coffee pot 1.

In this connection, a small amount of water will drip downward in addition through the filter plate 14 into the pot 1 until a positive pressure is produced in the pot, which equalizes the static pressure prevailing in the container 4.

The apparatus is now introduced into a microwave oven and is subjected to microwave radiation. The small amount of water in the coffee pot 1 will first start to boil, while the mixture in the mixture container 4 will be heated to just below the boiling point. This occurs, at least in part, because there is more water in the container than in the pot. The microwave radiation is now stopped. As a result, the steam in the coffee pot 1 cools rapidly, since the pot itself has not been heated. This produces a vacuum within the coffee pot 1 which draws the mixture in the container 4 down through the filter plate 14. After pressure equalization has taken place, the container can easily be removed from the neck of the coffee pot 1 by means of the handle 12.

If a particularly large coffee pot 1 is used, it is possible that this amount of water is in itself sufficient to produce the vacuum, as the water drips down into the coffee pot 1 upon the filling of the mixture container 4, until the static pressure of the mixture prevailing in the mixture container 4 is counteracted.

The embodiment of FIG. 2 has the same advantages as that of FIG. 1 and furthermore also the advantage that no positive pressure space is provided.

With the apparatus described, it is not only possible to produce coffee but also other brewable materials, such as, ersatz coffee or tea. By suitable dimensioning of a screening of the mixture container 4 and possibly also of the coffee pot 1, the time of heating can be lengthened should this be necessary, for instance, for the preparation of tea.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. Apparatus for preparing filtered coffee by use of microwave energy comprising:
   a vessel for containing said filtered coffee, said vessel having a vessel opening formed therein;
   a container including a single compartment for receiving and retaining a non-heated coffee mixture of coffee grounds and water, said container including an outlet adapted to be received by said vessel opening to pass said coffee mixture therethrough to said vessel;
   means to heat said coffee mixture through exposure to microwave energy; and
   filter means disposed across said outlet, said filter means having a resistance to flow which is slight enough that said heated coffee mixture passes through said filter to emerge as said filtered coffee.

2. The apparatus of claim 1, wherein said filter means includes filter paper.

3. The apparatus of claim 1, wherein said container is completely closed except for said outlet.

4. The apparatus of claim 1, wherein said includes means to allow steam to escape when said mixture is exposed to microwave energy.

5. The apparatus of claim 4, wherein said means to allow steam to escape includes an orifice formed in said container.

6. The apparatus of claim 1, wherein said filter means is supported at said outlet by a support means adapted to resist downward movement towards said vessel until a preset internal pressure level is exceeded in said container.

7. The apparatus of claim 1, wherein said container has a vent opening formed therein and said vessel is sealed by said container when said outlet is received by said vessel opening.

8. The apparatus of claim 1 wherein the walls of said vessel are at least partially pervious to microwave energy.

9. The apparatus of claim 1, wherein said vessel opening includes a neck portion formed therein.

10. The apparatus of claim 9, wherein said container has a bottom portion in which said outlet is defined; and, a sealing means disposed between said neck portion and said bottom portion of said container to seal said vessel when said outlet is received by said vessel opening.

11. The apparatus of claim 10 wherein said sealing means includes a flexible cuff secured to said bottom portion of said container and adapted to fit around said neck of said vessel.

12. The apparatus of claim 1, wherein said vessel is impervious to microwave energy.

13. The apparatus of claim 1, further including means to block said filter means from exposure to microwave energy.

* * * * *